No. 659,390. Patented Oct. 9, 1900.
A. FISCHER.
CHANGEABLE SPEED GEAR.
(Application filed Feb. 19, 1900.)
(No Model.)
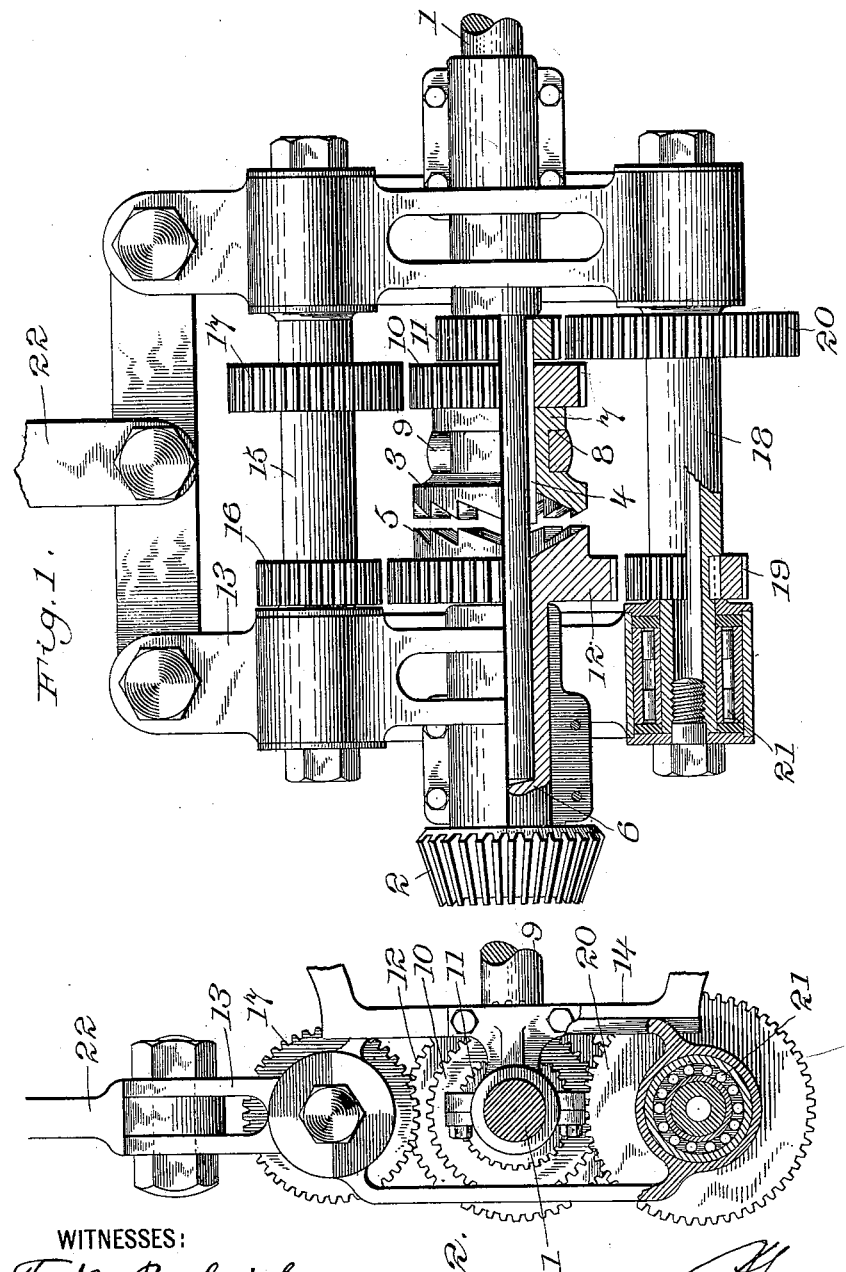
WITNESSES:
F. N. Roehrich
W. H. Pumphrey.
INVENTOR
Alexander Fischer
BY
ATTORNEY
THE NORRIS PETERS CO., PHOTO-LITHO., WASHINGTON, D. C.

UNITED STATES PATENT OFFICE.

ALEXANDER FISCHER, OF NEW YORK, N. Y.

CHANGEABLE-SPEED GEAR.

SPECIFICATION forming part of Letters Patent No. 659,390, dated October 9, 1900.

Application filed February 19, 1900. Serial No. 5,770. (No model.)

*To all whom it may concern:*

Be it known that I, ALEXANDER FISCHER, a citizen of the United States of America, and a resident of New York city, county of New York, State of New York, have invented certain new and useful Improvements in Changeable-Speed Gear, of which the following is a specification.

My invention relates to changeable-speed mechanism in general, and is more specifically designed to produce a simple and compact changeable-speed mechanism for automobile vehicles.

The preferred form of apparatus embodying my invention is illustrated in the accompanying sheet of drawings, in which—

Figure 1 is a plan view of the apparatus, certain parts being shown in section; and Fig. 2 is an end elevation thereof.

Throughout the drawings like reference-figures refer to like parts.

In vehicles of this description the driving-shaft 1 is usually rotated continuously at approximately-uniform speed by a gasolene-engine. The power is transmitted to the driving-wheels of the carriage through the bevel-gear 2 or similar apparatus. I provide a clutch-coupling 3, keyed on the driving-shaft and compelled to rotate therewith by the key 4, but moving axially along said driving-shaft. The corresponding clutch member 5 is provided on the rotating driven shaft 6, on which the gear 2 is mounted. This short driven shaft 6 may be made hollow throughout a portion of its length and the driving-shaft 1 extended and stepped therein, as shown, for the purpose of always maintaining the clutch members in alinement. The clutch-coupling 3 is preferably mounted on a sleeve 7 in order to give it a longer bearing on the driving-shaft 1, and this sleeve has an annular groove 8, with which a shifting fork 9 or equivalent device engages. This sleeve also carries two gears 10 and 11 of different diameters. The driven shaft 6 also has a gear 12 formed on its end adjacent to the clutch-face 5. A frame 13 is mounted in guides 14, upon which it is movable at right angles or radially to the line of the driving and driven shafts. This slidable frame carries a counter-shaft 15, journaled in it at one side of the driving-shaft. This shaft 15 carries gears 16 and 17, which mesh with the gears 12 and 10 of the driven and driving members when the slidable frame 13 is moved downward, (looking at Fig. 2.) On the other side of the driving-shaft the same slidable frame carries a second counter-shaft 18, which has gears 19 and 20, arranged to mesh with gears 12 and 11 on driven and driving members, respectively, when the slidable frame is moved upward, (looking at Fig. 2.) The shafts 15 and 18 preferably have roller-bearings in the slidable frame 13, as shown at 21, Fig. 2. A link 22 or other convenient means is provided for producing the sliding motion of the frame 13.

The mode of operation of my invention is as follows: The driving-shaft 1 is supposed to be continuously rotated in the direction to cause the clutch members 3 and 5 to engage when they approach one another. When said clutch members so interlock, the driven shaft 6 will revolve at the same rate of speed as the driving-shaft 1. By moving the fork 9 and shifting the sleeve 7 axially of the shafts the connections between said clutch members may be broken and the driving-shaft will run idly. If, then, the link 22 is moved so as to force the slidable frame 13 downward, (looking at Fig. 2,) the gear 16 will mesh with the gear 12 and the gear 17 with the gear 10. Motion in the same direction will then be transmitted from the driving-shaft 1 to the driven shaft 6 at about three-quarters speed. If the slidable frame 13 is, however, moved upward, (looking at Fig. 2,) the gears 12 and 19 and 11 and 20 will intermesh and motion will be transmitted at only about one-half speed or less to the driven shaft 6.

The advantages of my invention consist in the lightness of construction and few number of parts required. Moreover, the gears being all arranged in substantially the same plane the resulting structure has but little depth and presents a neat appearance under the body of the carriage.

Of course various changes could be made in the details of construction illustrated in the drawings without departing from the spirit and scope of my invention so long as the relative arrangement of parts or principle of operation described is preserved. Other forms of clutch might be substituted and the number of gears and their diameter might be changed; but these and similar modifications I should still consider within the scope of my invention. It is to be understood, of course, that while the slidable frame 13 is described as being movable up and down (looking at Fig. 2) it would be disposed in practice usually so as to slide horizontally under the body of the vehicle.

Having therefore described my invention, what I claim as new, and desire to protect by Letters Patent, is—

1. In a changeable-speed mechanism the combination of the driving-shaft, two gears of different diameter rotated thereby, a driven shaft in line with the driving-shaft, a driven gear thereon, the frame slidable along a line radial to the shafts, a counter-shaft journaled in said slidable frame on one side of said shafts, gears keyed to it of proper diameter to mesh simultaneously with the driven gear and with one of the driving-gears, a second counter-shaft journaled in the slidable frame on the other side of the shaft, and gears keyed to it of proper diameter to mesh with the driven gear and with the other driving-gear.

2. In a changeable-speed mechanism, the combination of the driving-shaft, two gears of different diameter rotated thereby, a driven shaft in line with the driving-shaft, a driven gear thereon, the frame slidable along a line radial to the shafts, a counter-shaft journaled in said slidable frame on one side of said shafts, gears keyed to it of proper diameter to mesh simultaneously with the driven gear and with one of the driving-gears, a second counter-shaft journaled in the slidable frame on the other side of the shaft and gears keyed to it of proper diameter to mesh with the driven gear and with the other driving-gear, together with the axially-slidable clutch between said driving and driven shafts.

3. In a changeable-speed mechanism, the combination of the driving-shaft, two gears of different diameter rotated thereby, a driven shaft in line with the driving-shaft, a driven gear thereon, the frame slidable along a line radial to the shafts, a counter-shaft journaled in said slidable frame on one side of said shafts, gears keyed to it of proper diameter to mesh simultaneously with the driven gear and with one of the driving-gears, a second counter-shaft journaled in the slidable frame on the other side of the shaft, and gears keyed to it of proper diameter to mesh with the driven gear and with the other driving-gear, together with the axially-slidable clutch between said driving and driven shafts, the sleeve carrying the driving portion of said clutch also carrying the two first-mentioned driving-gears.

4. In a changeable-speed mechanism the combination of the driving-shaft and driven shaft arranged in line one with the other, a clutch member on the end of the driven shaft, the corresponding axially-slidable clutch-sleeve on the driving-shaft, a gear-wheel formed integrally with the clutch member on the driven shaft, a gear-wheel rigidly mounted on the clutch-sleeve of the driving-shaft, a counter-shaft parallel to said driving and driven shafts and gear-wheels keyed thereon of suitable diameter to simultaneously mesh with the gear-wheels on the clutch member and clutch-sleeve, before described, and means for shifting said counter-shaft toward and from the driving and driven shafts so as to make and break connections between said gears.

Signed by me at Jersey City, New Jersey, this 14th day of February, 1900.

ALEXANDER FISCHER.

Witnesses:
GEO. B. ADAMS,
W. H. PUMPHREY.